United States Patent [19]

Cummins

[11] 4,027,548

[45] June 7, 1977

[54] REMOTE CONTROL MIRROR
[75] Inventor: James M. Cummins, Warren, Mich.
[73] Assignee: Mirrex, Incorporated, Warren, Mich.
[22] Filed: May 1, 1975
[21] Appl. No.: 573,685
[52] U.S. Cl. .............................. 74/501 M; 403/53; 403/61
[51] Int. Cl.² ......................................... G01P 3/20
[58] Field of Search ............ 74/96, 501 M; 403/61, 403/53, 220

[56] References Cited

UNITED STATES PATENTS

| | | | |
|---|---|---|---|
| 1,191,131 | 7/1916 | Sieber | 74/96 |
| 1,319,393 | 10/1919 | Aollis | 403/61 |
| 2,661,177 | 12/1953 | Aofer | 403/53 |
| 3,170,334 | 2/1965 | Shrode | 74/96 |
| 3,191,455 | 6/1965 | Fuqua | 74/501 |
| 3,195,369 | 7/1965 | Warhol | 403/220 |
| 3,780,598 | 12/1973 | Menger | 74/501 |
| 3,918,319 | 11/1975 | Mills | 74/501 |

Primary Examiner—William L. Freeh
Attorney, Agent, or Firm—Cullen, Settle, Sloman & Cantor

[57] ABSTRACT

A remotely controlled mirror system employs a cable control system interconnecting a control unit with the mirror backing plate, the backing plate being pivotally mounted relative to the mirror housing by means of cooperating semi-spherical head and socket portions thereon, which permit pivotal adjustment of the mirror about the two axes which are mutually perpendicular to the cable control system at its point of attachment to the mirror backing plate. Pivotal movement of the mirror about another axis parallel to the cable control system is prevented or restricted by interference between a pin secured to the socketed member and the side walls or surfaces of a slot in the head.

27 Claims, 13 Drawing Figures

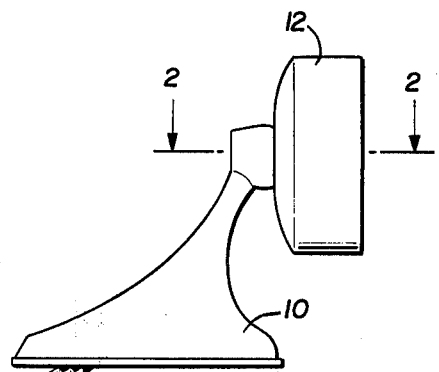
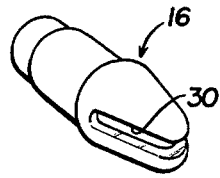
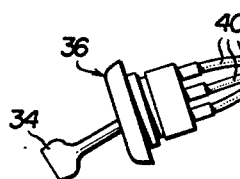
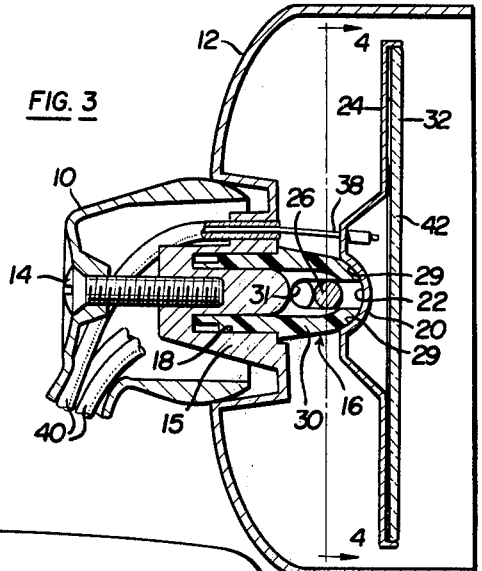
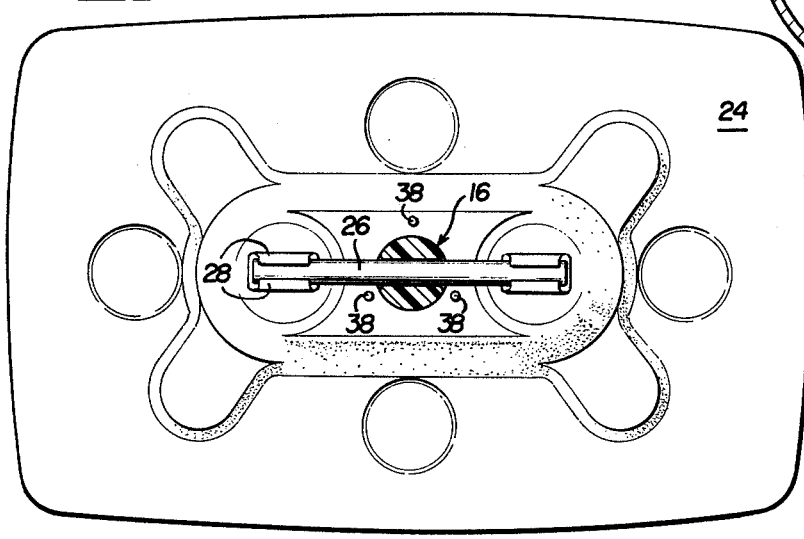

REMOTE CONTROL MIRROR

BACKGROUND OF THE INVENTION

The three-cable control system disclosed herein is widely used on automobiles for remotely controlling mirrors mounted thereon. One problem which has been experienced in units which employ a ball and socket type of universal mounting between the mirror and the mirror housing is that the mirror is free to rotate in the plane of the mirror, that is, about an axis which is generally parallel to the axes of the cables at their points of attachment to the mirror. This one axis of free movement is undesirable when the mirror is of non-circular shape, such as in the widely employed rectangular shape. Any rotation of the non-circular mirror in its own plane will result in corners of the mirror hitting portions of the protective mirror housing in which the mirror is commonly recessed. Such rotation may be induced by flutter or vibration induced by road irregularities or by slamming of the door on which the mirror is mounted. This condition often leads to binding and interference with free adjustability of the mirror.

The prior art has experimented with a variety of mirror mountings in an attempt to eliminate this problem, as for example, shown in prior art U.S. Pat. No. 3,780,598. Another prior art design has employed a pair of widely spaced pin-like projections on the interior of the mirror housing, generally parallel to the control cables, which are received in holes in the mirror backing plate. This configuration has not been entirely satisfactory, because in mirror positions of extreme angular adjustment, one of such pins generally backs out of its hole, leaving the mirror free to rotate in its own plane.

Accordingly, it is the primary object of the present invention to provide an improved adjustable mounting means for a remotely controlled mirror which reliably prevents rotation of the mirror in its own plane, without interfering with full adjustment of the mirror about the other two mutually perpendicular axes of rotation.

BRIEF DESCRIPTION OF THE DRAWINGS

FIG. 1 is an elevation of a typical remotely controlled mirror system, which is the environment of the present invention.

FIG. 3 is a sectional view taken along the plane 3—3 of FIG. 2.

FIG. 4 is a view, partly in section, taken along the plane 4—4 of FIG. 3.

FIG. 5 is a perspective view of the ball stud element employed in the embodiment of FIGS. 1–4 inclusive.

DETAILED DESCRIPTION OF THE INVENTION

In FIG. 1 of the drawings, the remotely controlled mirror system of the present invention generally comprises a mirror base 10 which may, for example, be secured to the outer door panel of an automobile, and a protective mirror housing 12 firmly secured to base 10 by screw 14. Base 10 and housing 12 are generally fabricated of cast metal.

Figure 6:
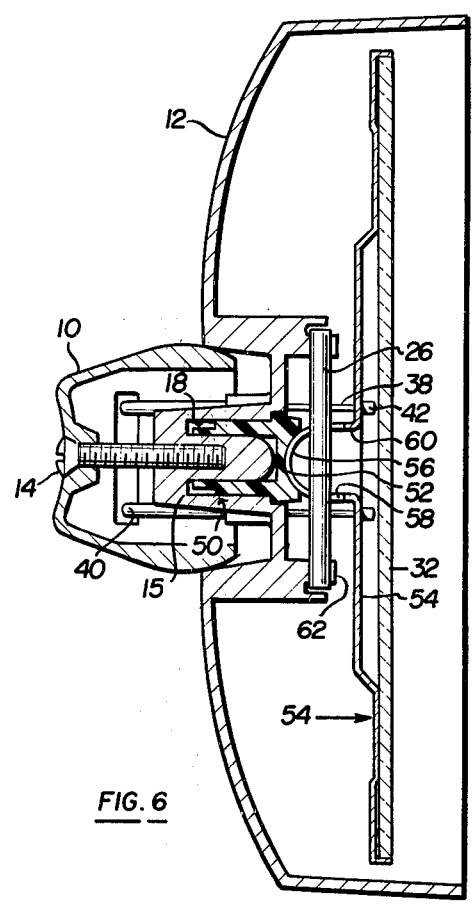
FIG. 6 is a view similar to FIG. 2, but showing an alternative embodiment of the present invention.
Figure 7:
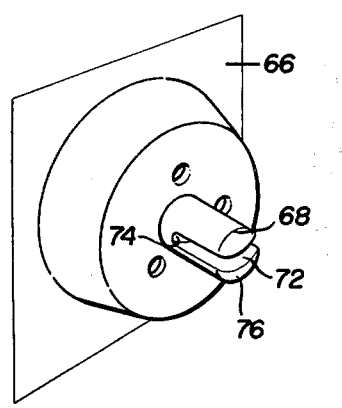
FIG. 7 is a fragmentary perspective view of a portion of a modified mirror housing having an integral slotted ball stud element cast or formed therewith, with the bottom surface of the slot of the metal ball stud element formed on a radius.
Figure 8:
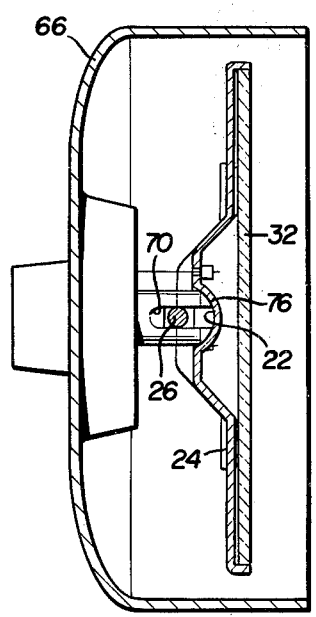
FIG. 8 is a sectional view, similar to FIG. 3, but showing another embodiment of the present invention which utilizes the integral mirror housing and slotted ball stud element shown in FIG. 7.
Figure 9:
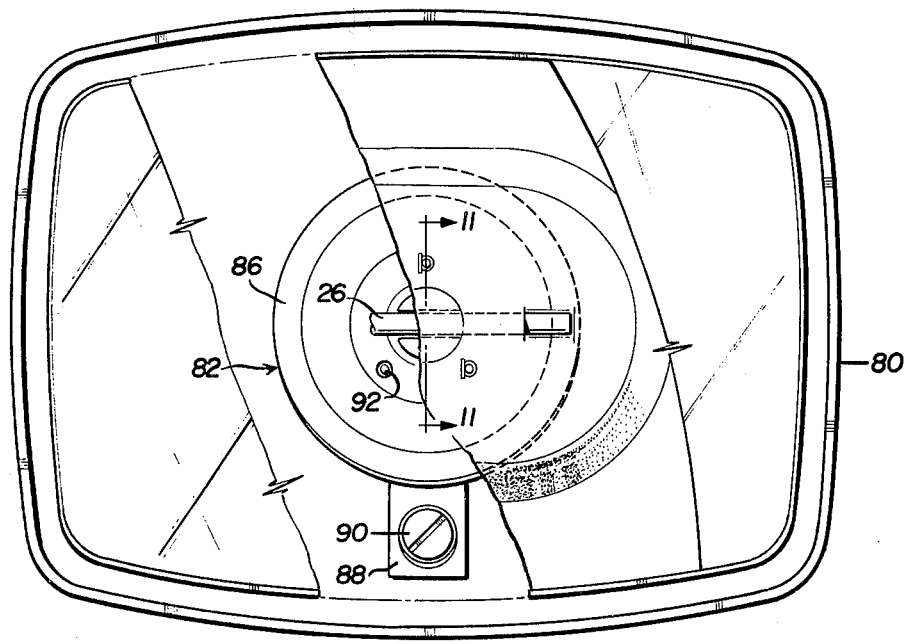
FIG. 9 is an elevational view of still another embodiment of the present invention, with portions broken away.
Figure 10:
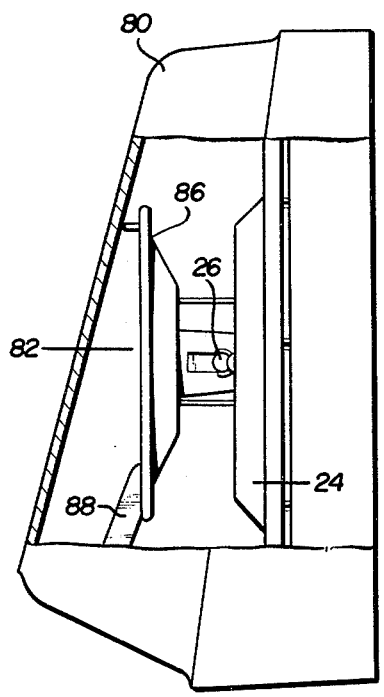
FIG. 10 is a side elevational view of the mirror structure of FIG. 9, with portions removed to show the interior thereof.

The protective mirror housing may be provided on the interior thereof with an integral embossment having an annular recess or cavity therein for the reception of a separate ball stud element or member as shown in the embodiments of FIGS. 2–5 inclusive and FIG. 6; or, as an alternative, the ball stud element or member may be casted or formed integrally with the protective mirror housing made of metal as shown in the embodiment of FIGS. 7 and 8; or, as another alternative, the ball stud element or member may be casted or formed as an integral part of a separate attaching member or insert bracket made of metal as shown in the embodiment of FIGS. 9–13 inclusive.

Figure 2:
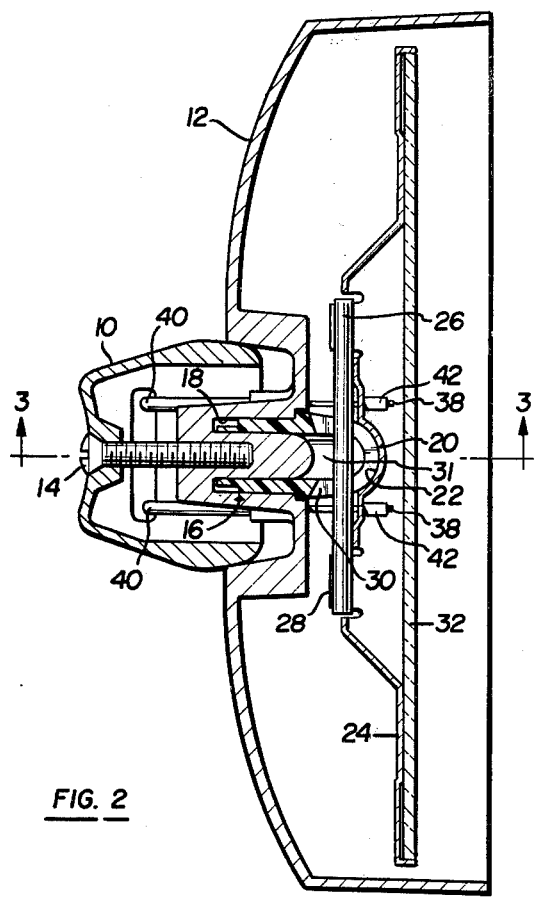
FIG. 2 is a sectional view of the mirror and mirror housing employing the present invention, the section being taken along the plane 2—2 of FIG 1.

Referring now to FIGS. 1–3 of the drawings, the protective mirror housing 12 is provided with an integral and centrally located embossment 15 in the back wall thereof. The embossment 15 is provided with a centrally located annular groove or recess 18, as best shown in FIGS. 2 and 3. A ball stud, or ball stud element or member 16, formed separately from the protective mirror housing 12, is firmly pressed or inserted into the annular groove or recess 18. Ball stud member 16 has a semi-spherical tip 20 at its right hand end, as viewed in FIG. 3, the spherical surface of which nests into and abuts a spherical socket 22 formed in the center of mirror backing plate 24. As illustrated, the ball stud member 16 is made from a plastic material although other materials may be used such as various metals.

As best shown in FIGS. 2, 3 and 4, a stabilizer or stabilizing pin or bar 26 is anchored to mirror backing plate 24 by a series of tabs 28. Stabilizing pin 26 is received in slot 30 of ball stud 16, the slot 30 opening toward spherical socket 22, as best shown in FIGS. 2 and 3. The slot 30 has a pair of generally parallel side walls or surfaces 29 and a semi-spherical or curved bottom surface 31 formed on a radius which matches the opposing spherical surface portion of the stabilizing pin 26. The semi-spherical bottom surface 31 may be engageable with or spaced slightly from the stabilizing pin 26, and such surface 31 may be of a different configuration than illustrated in FIGS. 2 and 3 such as tapered or arranged on a diagonal as in FIG. 13. Mirror 32 is secured to the backing plate 24 by conventional means.

The three cable control system for the mirror 32 is conventional, consisting of a remote control knob 34 which is universally pivotally mounted in a control unit 36 adapted to be located on the interior door panel of the automobile. Such a unit may be constructed in accordance with the disclosures of the U.S. Pat. Nos. 3,195,369 or 3,253,481, for example. In conventional fashion, movement of control knob 34 actuates three Bowden cables 38 longitudinally slidable within protective sleeves or armor 40. The ends of cables 38 remote from control knob 34 are inserted through base 10 and housing 12 and pass through small access holes in mirror backing plate 24 (see FIG. 4) and are anchored in the mirror backing plate 24 by means of retaining sleeves 42 which may be crimped in place on the cables 38.

The dimensioning of the mounting arrangement is such that the axis of stabilizing pin 26 is located so as to pass through the center of the semi-spherical surfaces of ball stud 16 and socket 22, thus permitting free rotation of the mirror about the axis of stabilizing pin 26 on the semi-spherical surface or tip 20 of ball stud 16. If the stabilizing pin 26 is spaced from the semi-spherical surface 31 of the bottom slot 30, rotation of the mirror 32 about the axis perpendicular thereto (which coincides with line 4—4 of FIG. 3) is permitted on the semi-spherical tip or area 20 of ball stud 16. If the stabilizing pin 26 is in engagement with the semi-spherical surface 31 of the bottom slot 30, rotation of the mirror 32 about the axis perpendicular thereto is permitted at the point where the pin 26 contacts the surface 31 of slot 30.

However, according to the present invention, rotation of the mirror in its own plane, that is, about the third mutually perpendicular axis (the axis generally parallel to cables 38 at their point of attachment to mirror backing plate 24 is prevented or restricted by interference between the stabilizing pin 26 and the side walls or surfaces 29 of slot 30. Thus, in all positions of adjustment of mirror 32, the mirror 32 is prevented from rotating in its own plane, thereby avoiding any possibility of binding or interference with free movement of the mirror resulting from contact between corners of the mirror and the interior of housing 12 in which the mirror is recessed.

Preferably, the diameter of the stabilizing pin 26 and the width of slot 30, as shown in FIG. 3, are selected to permit free entry of the pin 26 within the slot 30, but without any excess gap which would permit flutter. A small clearance of one to two thousandths of an inch is permissible. It should be understood that the stabilizing pin 26 may have a cross section other than circular as illustrated. The stabilizing pin 26 may, as an example, be of rectangular or other suitable configuration.

In connection with the other embodiments of the present invention, the same numbers as used in FIGS. 1–5 inclusive will be used to designate similar parts.

Referring now to the structure illustrated in FIG. 6, a modified stud element 50 is inserted or pressed into the annular cavity or recess 18 of the embossment 15. The stud element 50 is provided with a spherical socket 52 on the surface facing the mirror 32. The modified mirror backing plate 54 is provided with a cooperating spherical head or formation 56 which is received by the spherical socket 52. A slot 58 is provided in the generally parallel arm portions 60 of the spherical head 56 for receiving the stabilizing pin or bar 26. Stabilizing pin 26 is secured in the mirror protective housing 12 by means of a series of retaining tabs or formations 62.

The function and operation of the embodiment of FIG. 6 is similar to that of the embodiment of FIGS. 2–5 inclusive, in that the cooperating spherical formations and surfaces 52, 56 permit rotation of the mirror about two mutually perpendicular axes, while the cooperation of the stabilizing pin 26 and slot 58 prevent or restrict rotation of the mirror 32 in its own plane.

In FIGS. 7 and 8, the embodiment includes a modified protective mirror housing 66 having a centrally located integrally formed ball stud, ball stud element or member 68. The ball stud 68 has a slot 70 defined by a pair of side walls or surfaces 72 and a generally semi-spherical bottom surface 74. The mirror 32 is secured to the mirror backing plate 24 having a spherical seat or socket 22 for the reception of the semi-spherical tip or seat 76 provided on the ball stud 68. The stabilizing pin 26 as shown in FIG. 8 is carried by the backing plate 24 and is located in slot 70 of the ball stud 68 in the same manner as FIG. 3. Thus the stabilizing pin 26 may be in contact with the spherical bottom surface 74 of slot 70 or spaced slightly therefrom as explained previously. The mirror structure of FIGS. 7 and 8 operates and functions in the same manner as the embodiment of FIGS. 1–5 inclusive, with rotation of the mirror being permitted about two mutually perpendicular axes and restricted about another perpendicular axis which restricts the rotation of the mirror 32 in its own plane.

The final embodiment illustrated in FIGS. 9–13 inclusive illustrates a mirror protective housing 80 containing mirror 32, mirror back up plate 24 provided with the spherical seat or socket 22 and the stabilizing pin or bar 26.

A separate attaching member or insert bracket 82, made from metal, is provided and which contains an integral ball stud 84. The attaching member or insert bracket 8 contains a disc shaped portion 86 of generally circular configuration and an attaching tab portion 88. The integral ball stud 84 is centrally located on the axis of the disc portion 86 and has a semi-spherical surface area or tip 87. In assembly, the attaching member 82 carrying the ball stud 84 is secured to the mirror protective housing 80 by means of a conventional fastening element 90 such as a screw. The disc portion 86 is provided with three openings 92 for receiving the cables 38 which extend from the control unit 36, through the openings 92 in the disc portion 86 to the mirror backup plate 24, where the cables 38 are secured thereto by the retaining sleeves 42 which may be crimped in place on the cables 38.

Figure 12:
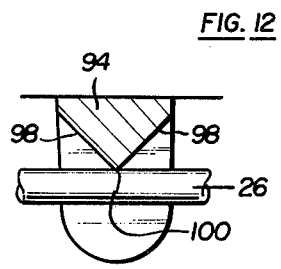
FIG. 12 is a sectional view taken on the plane 12—12 of FIG. 11.
Figure 13:
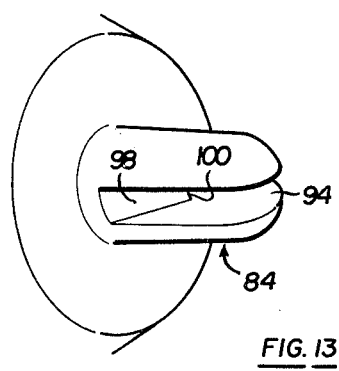
FIG. 13 is a fragmentary perspective view of the slotted ball stud element utilized in the embodiment of FIGS. 9–12 inclusive.

The ball stud 84 of the attaching member or insert bracket includes a pair of generally parallel side surfaces 94 and a bottom surface 96 defined by a pair of inclined or tapered surface portions 98 intersecting along an area 100 as shown in FIGS. 12 and 13. The stabilizing pin or bar 26 engages area 100 of the ball stud 84 as shown in FIG. 12.

Figure 11:
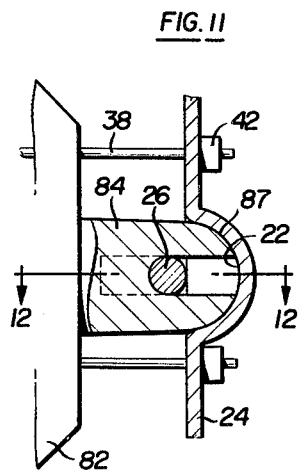
FIG. 11 is a sectional view taken on the plane 11—11 of FIG. 9.

The dimensioning of the mounting arrangement is such that the axis of stabilizing pin 26 is located as to pass through the center of the semi-spherical surfaces of ball stud 84 and socket 22, thereby permitting free rotation of the mirror about the axis of stabilizing pin 26 on the semi-spherical tip or area of ball stud 87 which is seated in the spherical seat or socket 22 of the mirror backing plate 24 as shown in FIG. 11. When the stabilizing pin 26 is in engagement with the bottom surface area 100 (FIG. 12) of the ball stud 84, rotation of the mirror 32 is permitted, with the pin 26 pivoting on area 100.

The function and operation of the embodiment of FIGS. 9–13 inclusive is similar to that of the embodiment of FIGS. 2–5 inclusive in that the cooperating spherical formations and surfaces 22, 87 permit rotation of the mirror about two mutually perpendicular axes, while the cooperation of the stabilizing pin 26 and the slotted ball stud 84 prevent or restrict rotation of the mirror 32 in its own plane.

With the use of any one of the foregoing described mirror structures, the rotation of the non-circular mirror 32 in its own plane within its protective mirror housing is restricted thereby eliminating the possibility of the corners of the mirror striking portions of the housing as a result of flutter or vibration induced in the mirror structure in any manner. Thus free adjustability of the mirror is insured about two mutually perpendicualr axes.

It should be appreciated that the cable linkage system disclosed herein may be operated manually as shown or by other suitable means, as an example, by an electric motor, a hydraulic motor, a vacuum responsive system or even magnetically. In addition, the cable linkage system may use one or any number of cables as is well known in the art.

This invention may be further developed within the scope of the following claims. Accordingly, the above specification is to be interpreted as illustrative of only two operative embodiments of the present invention, rather than in a strictly limited sense.

I now claim:

1. In a remotely controlled mirror system of the type including a mirror anchored to a mirror backing plate whose position is adjustable relative to a mirror housing by means of a cable linkage interconnecting the mirror backing plate with a control unit, the improved means for mounting the mirror backing plate to the mirror housing, comprising:

a joint comprising a semi-spherical head on a first element and a semi-spherical head-receiving socket on a second element, one of said cooperating head and socket elements forming a part of the housing, and the other of said cooperating elements forming a part of the mirror backing plate, said elements being held in abutting but relatively pivotal contact by the tension of the cable linkage exerting a force pulling the mirror backing plate toward and against the cooperating element of the housing;

a slot traversing said semi-spherical head of said first element and opening towards said head-receiving socket of said second element;

and a stabilizing pin secured to the one of said backing plate and housing of which said socket element forms a part, said stabilizing pin being received in said slot;

said pin and slot being so oriented that rotation of the mirror about a first axis substantially parallel to the cable linkage at its attachment point to the mirror backing plate is restricted by the resultant interference between said pin and the side surfaces of said slot, while leaving the mirror free to rotate about a second axis mutually perpendicular to said first axis.

2. The mirror system of claim 1 wherein said first element containing said semi-spherical head forms a part of the housing and wherein said second element containing said socket is formed in the mirror backing plate.

3. The mirror system of claim 1 wherein said first element is in the form of a ball stud element having said semi-spherical head thereon, said ball stud element being formed integrally with the housing.

4. The mirror system of claim 1 wherein an insert bracket is secured to the housing, said first element having said semi-spherical head being attached to said insert bracket and wherein said second element containing said socket is formed in the mirror backing plate.

5. The mirror system of claim 1 wherein said pin and slot is also oriented so that the mirror is also free to rotate about a third axis which is mutually perpendicular to said first and second axes.

6. The mirror system of claim 5 wherein said first element containing said semi-spherical head forms a part of the mirror backing plate and wherein said second element containing said socket forms a part of the mirror housing.

7. The mirror system of claim 6 wherein said mirror backing plate has a series of retaining tabs for locating and positioning said stabilizing pin.

8. The mirror system of claim 5 wherein an insert bracket is secured to the housing, said first element having said semi-spherical head being attached to said insert bracket and wherein said second element containing said socket is formed in the mirror backing plate.

9. The mirror system of claim 8 wherein said bottom surface includes a pair of intersecting generally flat and inclined surface portions.

10. The mirror system of claim 8 wherein said pin is cylindrical, said pin engaging said surface portions at the place where the surface portions intersect.

11. The mirror system of claim 1 wherein said first element containing said semi-spherical head forms a part of the mirror backing plate and wherein said second element containing said socket forms a part of the mirror housing.

12. The mirror system of claim 5 wherein said first element containing said semi-spherical head forms a part of the housing and wherein said second element containing said socket is formed in the mirror backing plate.

13. The mirror system of claim 1 wherein said first element is in the form of a ball stud element having said semi-spherical head thereon, said ball stud element being received in an annular opening provided in the housing.

14. The mirror system of claim 13 wherein said ball stud element is made from a plastic material.

15. The mirror system of claim 1 wherein the slot of said first element is defined by said side surfaces and a bottom surface, said stabilizing pin being spaced from said bottom surface.

16. The mirror system of claim 15 wherein said bottom surface being formed on a radius.

17. The mirror system of claim 15 wherein said bottom surface includes a pair of intersecting generally flat and inclined surface portions.

18. The mirror system of claim 1 wherein the slot of said first element is defined by said side surfaces and a bottom surface, said stabilizing pin being in engagement with said bottom surface.

19. The mirror system of claim 18 wherein said bottom surface is formed on a radius.

20. The mirror system of claim 18 wherein said pin is cylindrical and said bottom surface is formed on a radius.

21. The mirror system of claim 18 wherein said bottom surface includes a pair of intersecting generally flat and inclined surface portions.

22. The mirror system of claim 21 wherein said pin is cylindrical, said pin engaging said surface portions at the place where the surface portions intersect.

23. In a remotely controlled mirror system of the type including a non-circular mirror recessed within a housing protectively enclosing said mirror said mirror being anchored to a mirror backing plate whose position is selectively adjustable relative to the mirror housing by means of a cable control system having a plurality of individual cables interconnecting the mirror backing plate with a control unit, an improved means for mounting the mirror backing plate to the mirror housing comprising:

a head and socket assembly including a semi-spherical head element carried by said mirror housing and a semi-spherical head-receiving socket element carried by said mirror backing plate;

slot means traversing said semi-spherical head element of said mirror housing and opening toward said head-receiving socket element of said mirror backing plate, said slot means having a pair of generally parallel side walls joined by a slot bottom;

a stabilizing pin secured to said mirror backing plate, said stabilizing pin having a pin axis and an intermediate portion adapted to be received laterally within said slot means and between said pair of generally parallel side walls; and means operatively positioning said semi-spherical head element in abutting but relatively pivotal contact with said semi-spherical head-receiving socket element by the tension of said plurality of cables tending to pull the socket element and said mirror backing plate attached thereto toward and against said semi-spherical head element of said housing such that the axis of said stabilizing pin is disposed so as to pass centrally between said side walls of said slot means so as to permit rotation of said mirror about the axis of said stabalizing pin upon the semi-spherical surface of said head element while simultaneously permitting the rotation of said mirror about a second axis perpendicular to said pin axis and perpendicular to an axis generally parallel to the direction in which said plurality of cables interconnect to said mirror backing plate at the points of attachment thereto and prohibiting rotation of said mirror in its own plane about a third axis mutually perpendicular to said pin axis and said second axis.

24. The improved mirror mounting means of claim 23 further characterized in that said stabilizing pin is disposed centrally between said pair of generally parallel side walls of said slot means at a location spaced from said slot bottom to effect rotation of said mirror about said second axis on the semi-spherical surface of said head element.

25. The improved mirror mounting means of claim 23 further characterized in that said stabilizing pin is centrally disposed between said pair of generally parallel side walls of said slot means and in engagement with said slot bottom for effecting the rotation of said mirror about said second axes upon the point of contact between said stabilizing pin and said slot bottom.

26. The improved mirror mounting means of claim 25 wherein said stabilizing pin is generally cylindrical and wherein said slot bottom includes an arcuate surface configuration for receiving said generally cylindrical stabilizing pin into pivotal contact therewith.

27. The improved mirror mounting means of claim 25 wherein said slot bottom includes a pair of inclined bottom surface portions intersecting centrally between said pair of side walls such that the point of intersection thereof is the point of contact between said stabilizing pin and said slot bottom upon which the rotation of said mirror about said second axis is accomplished.

* * * * *